United States Patent Office 2,930,803
Patented Mar. 29, 1960

2,930,803

PROCESS FOR THE CATALYTIC REDUCTION OF ALKYLATED OR ARYLATED ANTHRAQUINONES

William Raymond Holmes and Charles William Le Feuvre, Luton, Raymond Lait, St. Albans, and William Stanley Wood, Harpenden, England, assignors to La Porte Chemicals Limited, Luton, England, a British company No Drawing. Application June 3, 1954
Serial No. 434,338

Claims priority, application Great Britain June 9, 1953

4 Claims. (Cl. 260—369)

This invention relates to improvements in catalytic reduction of alkylated or arylated anthraquinones to alkylated or arylated anthraquinhydrones or alkylated or arylated anthraquinols, and the application thereof to the manufacture of hydrogen peroxide.

It is already well known that hydrogen peroxide can be manufactured by a process employing the autoxidation of certain organic compounds. Thus, for example, United Kingdom specification No. 465,070 describes a process for the production of hydrogen peroxide in which an alkylated anthraquinone is hydrogenated in a solvent by means of hydrogen in the presence of a catalyst, to the corresponding anthraquinol, which after separation of the catalyst, is oxidised with oxygen to produce hydrogen peroxide with regeneration of the alkylated anthraquinone. The process is thus cyclic as the alkylated anthraquinone is recycled to the hydrogenation stage after removal of the hydrogen peroxide by, for example, aqueous extraction.

Various catalysts have been proposed for use in the reduction stage, one of the most usual being activated nickel.

United Kingdom specification No. 508,081 mentions the use of active palladium as a hydrogenation catalyst in the reduction of anthraquinones to anthraquinol, but this specification does not disclose how the catalyst was prepared or used. United Kingdom specification No. 686,-574 describes a process for the production of hydrogen peroxide in which an alkylated anthraquinone is hydrogenated in solution by means of hydrogen in the presence of a catalyst consisting of metallic palladium supported on activated alumina, the catalyst preferably containing 0.01% to 10% by weight of palladium and being suspended in the solution of the alkylated anthraquinone by means of a stream of hydrogen-containing gas. This specification also discloses the use of palladium catalyst on carriers of silica-alumina, coconut charcoal, active coal carbon, activated lignin carbon, decolourising vegetable carbon, granular corundum, silica gel, barium sulphate and fibrous asbestos. According to this specification none of these carriers give as good results as activated alumina.

United States application Serial No. 350,519, now abandoned, describes a process for preparing a palladium catalyst for use in the reduction of anthraquinones wherein a palladium salt is absorbed from a solution on to a carrier of gamma alumina or gamma alumina monohydrate, which is then treated with a water-soluble metal hydroxide or carbonate to form a hydrated oxide or basic carbonate, which is thereafter reduced to metallic palladium.

It is an object of this invention to provide an improved catalyst for use in the hydrogenation stage of the process for the production of hydrogen peroxide by the cyclic reduction and oxidation of alkylated or arylated anthraquinones.

It has now been found according to this invention that satisfactory results in the hydrogenation of alkylated or arylated anthraquinones to alkylated or arylated anthraquinhydrones or alkylated or arylated anthraquinols can be obtained by using as a catalyst palladium deposited on a magnesium oxide, partially hydrated magnesium oxide or magnesium hydroxide carrier.

Accordingly, the present invention provides a process for the production of alkylated or arylated anthraquinhydrones or alkylated or arylated anthraquinols from alkylated or arylated anthraquinones wherein an alkylated or arylated anthraquinone in solution in a solvent or solvent mixture is reduced by means of hydrogen in the presence of a palladium catalyst material comprising metallic palladium deposited on magnesium oxide, partially hydrated magnesium oxide or magnesium hydroxide.

The present invention also includes a process for the production of hydrogen peroxide by the hydrogenation of an alkylated or arylated anthraquinone in a solvent or solvent mixture by means of hydrogen in the presence of a palladium catalyst material comprising metallic palladium deposited on magnesium oxide, partially hydrated magnesium oxide or magnesium hydroxide, to the corresponding alkylated or arylated anthraquinhydrone or alkylated or arylated anthraquinol, which after separation of the catalyst, is oxidised by means of oxygen or oxygen-containing gas to hydrogen peroxide, with regeneration of the alkylated or arylated anthraquinone.

If magnesium oxide is used it is preferably an active magnesium oxide (as hereinafter defined).

The term "active magnesium oxide" as used herein refers to a magnesium oxide which has not been heated to a temperature greater than 1500° C. and which is therefore capable of rehydration and which retains its adsorptive or hydrating capacity.

A satisfactory partially dehydrated magnesium hydroxide may be prepared by heating a precipitated magnesium hydroxide, for example at 300° C., to effect partial dehydration.

It is important to note that not all forms of magnesium oxide are equally suitable for use as catalyst carriers in the present invention. Thus, we have found, for example, that a palladium catalyst deposited on commercial magnesium oxide which hydrated only slowly and incompletely in water, had little activity, although it can be used in the process of the invention.

It is preferable for the palladium catalyst material used in the present invention to have a particle size corresponding to a screen aperture between 0.001" and 0.1" and to be suspended in the solution. The use of particle sizes corresponding to a screen aperture finer than 0.001" is undesirable because the catalyst then becomes difficult to filter from the solution, while catalyst particles corresponding to a screen aperture coarser than 0.1" are difficult to suspend in the solution. By using a catalyst of the above particle size it is possible to keep the catalyst in free suspension in solution without agitation other than that provided by the gas stream, thus lengthening the active life and reducing the danger of abrasion and disintegration.

The present invention is, of course, not restricted to the use of a palladium catalyst material having a particle size corresponding to a screen aperture between 0.001" and 0.1" as it is also possible to use the catalyst material in a coarser form which can, for example, be in a fixed bed through which the working solution and the hydrogen gas are passed, either in a co-current or counter-current direction.

The palladium catalysts employed according to the processes of the present invention are suitable for use in free suspension in a hydrogenator and, as previously stated, the catalysts can be made of such particle size that separation from the solution may be substantially and simply achieved by means of filtration or a short period of settling. As previously stated, the catalysts may also be of larger particle size so that they may be used in the form of a fixed bed.

Catalysts of palladium deposited on the carriers employed according to the present invention may be reactivated after use by heating in a stream of oxygen, air or other oxygen-containing gas, for example at a temperature of 250° C., whereby a palladium oxide is obtained which may be reduced back to the metal by a reducing agent either in the hydrogenator or before being returned to the hydrogenator. When using a catalyst supported on magnesium hydroxide it may be necessary to hydrate the support again with water after this treatment. It has, however, been found that complete dehydration of the magnesium hydroxide will not seriously affect the activity of the catalyst.

It is stated in United Kingdom specification No. 686,574 that the combination of metallic palladium supported on activated alumina appears to be unique as a hydrogenation catalyst for the reduction of alkylated anthraquinones to alkylated anthraquinols. It is also stated that catalysts consisting of palladium supported on other common materials well-known as active hydrogenation catalysts in other reactions, are almost completely inert and valueless for the present purpose. We have found, however, that this is not the case, as catalysts prepared from palladium supported on magnesium hydroxide have as high an activity as those prepared from paladium supported on activated alumina. This is illustrated by the following comparative Examples 1 and 2.

Example 1

The catalyst was prepared as follows:

A solution containing 500 gms. of magnesium choride crystals ($MgCl_2.6H_2O$), in 8 litres of water was made up and to this a solution containing 40 gms./litre of sodium hydroxide was slowly added until complete precipitation had occurred. The precipitate was filtered, washed with water until substantially free from alkali and then dried at 300° C. The product was then ground, rewashed with water and dried at 300° C. and sieved through 100 and 240 B.s.s. mesh screens. 30 gms. of the magnesium hydroxide, as above prepared, were then treated with 300 ccs. of a solution of sodium chlorpalladite containing 3.3 gms./litre of palladium chloride and 2.2 gms./litre of sodium chloride, and the mixture was stirred for ten minutes until the solution was colourless. The excess solution was decanted off and the resultant catalyst dried on a water bath after which it was ready for use.

The catalyst (2.0% Pd) was suspended in a hydrogenator vessel in a solution containing 100 gms./litre of 2-ethyl anthraquinone in a solvent mixture containing equal volumes of benzene and methyl cyclohexanol acetate, the catalyst concentration being 10 gms./litre. The rate of formation of 2-ethyl anthraquinol was determined and the result expressed as the equivalent rate of formation of hydrogen peroxide per gm. of catalyst per hour. With a palladium catalyst on hydrated magnesium oxide, prepared as described above, the result was 3.5 gms. of hydrogen peroxide per gm. of catalyst per hour. The comparable figure for a palladium catalyst on a gamma alumina as described in United States application Ser. No. 350,519, now abandoned, was 2.5 gms. of hydrogen peroxide per gm. of catalyst per hour.

Example 2

A catalyst was prepared in the following way: One part by weight of magnesium hydroxide, prepared as in Example 1, was stirred vigorously with 6 parts by weight of water; a palladous chloride solution containing the equivalent of 4 gms./litre of palladium and also 2 ccs./litre of concentrated hydrochloric acid, was then added dropwise to the stirred suspension. The volume of solution added contained a weight of paladium equal to 2% of the weight of the magnesium hydroxide. After a further short period of stirring, the colourless, supernatant, liquor was decanted, and the solid washed four times with 16 parts by weight of water. It was then sucked dry at the pump and dried at 120° C. When tested, as described in Example 1, the rate of formation of 2-ethyl anthraquinol wtih this catalyst, expressed as the equivalent rate of formation of hydrogen peroxide, was 5.05 gms. of hydrogen peroxide per gm. of catalyst per hour.

Similar results can be obtained by reducing the palladium salt, oxide or hydrated oxide deposited on the carrier before it is introduced into the hydrogenator.

Example 3

The catalyst was prepared as described in Example 1.

A solution containing 50 gms. of 2-ethyl anthraquinone per litre of a solvent mixture of equal volumes of benzene and methyl cyclohexanol acetate, was passed through a hydrogenator vessel as described in U.S. application Ser. No. 330,453, now abandoned, and reduced by a stream of hydrogen in the presence of the catalyst. After oxidising the 2-ethyl anthraquinhydrone back to the 2-ethyl anthraquinone the hydrogen peroxide which was also formed was extracted from the solution with water and the organic solution returned to the hydrogenation stage, the rate of flow of solution being 4.4 litres/hr. In the hydrogenation stage 10 gms. of the catalyst, prepared as described above, were added to the hydrogenator and hydrogenation carried out until the catalyst was substantially completely de-activated. The total weight of hydrogen peroxide formed was 140 gms. of hydrogen peroxide per gm. of catalyst.

The reactivation of the catalyst may be effected as follows:

The de-activated catalyst was washed with benzene and heated in a stream of air for 18 hours at 250° C.

After this treatment the catalyst was employed again, its activity and life being similar to that of the fresh catalyst.

Alternatively, the catalyst may be reactivated as follows:

The catalyst, when recovered from the hydrogenator, was washed with benzene and dried at 120° C. 15 gms. of this catalyst were taken and 20 ccs. of normal sodium hydroxide solution were added. This mixture was warmed to 80° C. and stirred for two minutes, after which the solution was decanted off and the catalyst washed with water until the washings were colourless. The caustic soda treatment was repeated, and the catalyst finally washed and dried at 120° C. When this reactivated catalyst was tested again, the yield of hydrogen peroxide was 130 gms. per gm. of catalyst.

Example 4

5 litres of sodium hydroxide solution (40 gms./litre) were added slowly to 3 kgs. of light magnesium oxide with steady stirring until a thick paste was formed. This paste was allowed to stand for 15 hours, after which it was dried at 120° C. The resulting hard support of magnesium hydroxide was ground and sieved between 100 and 240 mesh B.s.s. screens.

600 gms. of this ground support were then washed, dried at 120° C., and added to 1 litre of sodium chlorpalladite solution containing 12 gms. of palladium. After the catalyst had settled, the excess colourless solution was decanted off, and the resulting catalyst washed and then dried at 120° C. The catalyst, which was to be reduced in situ, was suspended in a hydrogenator in the presence of hydrogen at a pressure of 1.0 atmosphere in a solution containing 100 gms. per litre of 2-tertiary butyl anthraquinone in a solvent mixture of equal volumes of benzene and methyl cyclohexanol acetate. The catalyst concentration was 10 gms./litre. The rate of formation of 2-tertiary butyl anthraquinol, expressed as the equivalent rate of formation of hydrogen peroxide, was 5.0 gms. of hydrogen peroxide per gm. of catalyst per hour.

5 gms. of this same catalyst were then heated to 400° C. in a stream of dry air for 4 hours, to dehydrate the magnesium hydroxide to oxide. When tested as above, however, the rate of formation of 2-tertiary butyl anthraquinol expressed as the equivalent rate of formation of hydrogen peroxide, was 5.5 gms. of hydrogen peroxide per gm. of catalyst per hour. This example shows that the complete dehydration of magnesium hydroxide to oxide does not reduce the activity of the catalyst, based on the use of the same weight of palladium, to less than 75% of the original.

This example also illustrates the advantage of using the carriers employed according to the present invention, because of the simplicity of the palladising operation. Thus, it is merely necessary to add the dry support to the palladium salt solution and, after allowing it to stand, filtering, washing, and drying the catalyst. In the method described in United Kingdom specification No. 686,574, however, for the preparation of palladium on alumina catalysts, the preparation involves heating, and the addition of formaldehyde and sodium bicarbonate, while the use of these additional chemicals greatly increases the possibility that the valuable palladium will be precipitated by reduction or hydrolysis, but not on the carrier, and so lost to the process. A further advantage is that, if desired, a high-percentage palladium catalyst may be prepared in a single operation. Thus, when using 100–240 mesh B.s.s. magnesium hydroxide, as described above, it is possible to obtain a catalyst containing 30% palladium by weight.

*Example 5*

A solution containing 70 gms./litre of 2-ethyl anthraquinone in each litre of a solvent mixture containing equal volumes of methyl cyclohexanol acetate and an aromatic hydrocarbon mixture consisting mainly of di- and tri-alkyl benzenes was cycled through a hydrogenator, using a 2% palladium on magnesium hydroxide catalyst prepared as described in Example 4. Sufficient catalyst was added initially to the hydrogenator to provide a satisfactory hydrogenation rate, and this was maintained by subsequent additions of catalyst. The yield of hydrogen peroxide during these additions was 177 gms. of hydrogen peroxide per gm. of catalyst added. The catalyst was then removed from the hydrogenator, washed with benzene, dried at 120° C. and heated in a stream of air at 250° C. for 48 hours. The resulting catalyst was used again as before, and the yield during catalyst additions was 237 gms. of hydrogen peroxide per gm. of catalyst. Thus, complete reactivation of the catalyst was achieved.

A further advantage of the use of the catalysts employed in the present invention seems to be a lower rate of formation of the tetrahydro-anthraquinol derivative compared with the rate of formation of the anthraquinol itself. This is illustrated in the following example:

*Example 6*

A solution containing 2.5 gms. of 2-ethyl anthraquinone in a mixture of 50 ccs. of benzene and 65 ccs. of methyl cyclohexanol acetate was agitated at a hydrogen pressure of 1 atmosphere in the presence of 1 gm. of a catalyst containing 2% of palladium on magnesium hydroxide, and prepared as described in Example 2. Within 15 minutes, all the quinone had been reduced to the quinol, but a much slower uptake of hydrogen continued, with the formation of 2-ethyl tetrahydro-anthraquinol. The corresponding ratio of the velocity of the hydrogenation of the quinone groups to that of the nucleus was 390:1. When this example was repeated, using a catalyst consisting of 2% palladium on activated alumina, prepared as described in U.S. application Ser. No. 350,519, now abandoned, the corresponding ratio of velocity of quinone hydrogenation to that of nuclear hydrogenation was 170:1.

*Example 7*

100 ccs. of sodium chlorpalladite solution (containing 2 gms./litre of palladium) in equal volumes of acetone and ethyl acetate, were slowly added to 10 gms. of heavy magnesium oxide. The mixture was evaporated on a water bath after each addition. The magnesium oxide used had previously been screened between 100–240 B.s.s. screens. When tested for activity, as in Example 1, the rate of formation of 2-ethyl anthraquinol, as equivalent hydrogen peroxide, was 2.0 gms. of hydrogen peroxide per gm. of catalyst per hour. This example shows that an active catalyst can be obtained from an organic solution of palladium without hydration of the magnesium oxide.

The activity of the catalyst described in this invention is not adversely affected by the presence of hydrogen peroxide or oxygen in the working solution, so that no special precautions are necessary for removing them before the solution comes in contact with the catalyst. Also the present catalyst has a relatively long active life and can be easily regenerated.

The catalyst employed in this invention also has the advantage that it is in a hard form and is not easily abraded during the hydrogenation reaction.

Any alkylated or arylated anthraquinone with its corresponding alkylated or arylated anthraquinhydrone or alkylated or arylated anthraquinol can be used as the organic intermediates in this process for the manufacture of hydrogen peroxide.

Examples of alkylated anthraquinones which may be used are 2-ethyl anthraquinone and 2-tertiary butyl anthraquinone.

Examples of solvents for the alkylated or arylated anthraquinhydrones or alkylated or arylated anthraquinols which may be employed are cyclohexanol acetate or propionate or methyl cyclohexanol acetate or propionate.

Examples of the other component of the solvent mixture which may be used are benzene or other liquid hydrocarbons such as toluene or xylene.

What we claim is:

1. A process for the production of anthraquinone derivatives selected from the group consisting of alkylated and arylated anthraquinhydrones and alkylated and arylated anthraquinols, which comprises reducing a substituted anthraquinone selected from the group consisting of alkylated and arylated anthraquinones in solution in at least one solvent by means of hydrogen in the presence of a catalyst material comprising metallic palladium deposited on a magnesium hydroxide carrier, said carrier being prepared by mixing magnesium chloride with sodium hydroxide to precipitate magnesium hydroxide, then separating, grinding and drying at not more than 300° C. said magnesium hydroxide, to form said carrier.

2. The process of claim 1 wherein said palladium is deposited on said carrier from a solution of palladium compound selected from the group consisting of sodium chlorpalladite and palladium chloride.

3. A process for the production of anthraquinone derivatives selected from the group consisting of alkylated and arylated anthraquinhydrones and alkylated and arylated anthraquinols, which comprises reducing a substituted anthraquinone selected from the group consisting of, alkylated and arylated anthraquinones in solution in at least one solvent by means of hydrogen in the presence of a catalyst material comprising metallic palladium deposited on a magnesium hydroxide carrier, said carrier being prepared by mixing magnesium oxide with sodium hydroxide to form a paste of magnesium hydroxide, drying said paste at not more than 120° C., and then grinding said dried magnesium hydroxide to form said carrier.

4. The process of claim 3 wherein said palladium is deposited on said carrier from a solution of sodium chlorpalladite.

References Cited in the file of this patent

UNITED STATES PATENTS

| | | |
|---|---|---|
| 2,445,345 | Byrns | July 20, 1948 |
| 2,657,980 | Sprauer | Nov. 3, 1953 |
| 2,668,753 | Harris et al. | Feb. 9, 1954 |
| 2,739,042 | Corey et al. | Mar. 20, 1956 |

FOREIGN PATENTS

| | | |
|---|---|---|
| 519,509 | Belgium | May 15, 1953 |
| 161,367 | Australia | Feb. 22, 1955 |

OTHER REFERENCES

Paal et al.: "Berichte," vol. 46, pages 3069–3074 (1913).